(12) United States Patent
    Shemesh

(10) Patent No.: US 10,543,724 B2
(45) Date of Patent: Jan. 28, 2020

(54) WHEEL RIM ACCESSORY AND METHOD FOR ASSEMBLING THEREOF

(71) Applicant: Jhonatan Shemesh, Tel-Aviv (IL)

(72) Inventor: Jhonatan Shemesh, Tel-Aviv (IL)

( * ) Notice: Subject to any disclaimer, the term of this patent is extended or adjusted under 35 U.S.C. 154(b) by 73 days.

(21) Appl. No.: 15/569,405

(22) PCT Filed: May 3, 2016

(86) PCT No.: PCT/IB2016/052501
    § 371 (c)(1),
    (2) Date: Oct. 26, 2017

(87) PCT Pub. No.: WO2016/178137
    PCT Pub. Date: Nov. 10, 2016

(65) Prior Publication Data
    US 2018/0222137 A1      Aug. 9, 2018

Related U.S. Application Data

(60) Provisional application No. 62/156,901, filed on May 5, 2015.

(51) Int. Cl.
    | | |
    |---|---|
    | *B60C 23/10* | (2006.01) |
    | *B29C 73/22* | (2006.01) |
    | *B60C 23/00* | (2006.01) |
    | *B29C 73/02* | (2006.01) |
    | *F16F 15/32* | (2006.01) |
    | *G07C 5/00* | (2006.01) |
    | *B29C 73/16* | (2006.01) |

(52) U.S. Cl.
    CPC .............. *B60C 23/10* (2013.01); *B29C 73/025* (2013.01); *B29C 73/22* (2013.01); *B60C 23/004* (2013.01); *F16F 15/324* (2013.01); *G07C 5/008* (2013.01); *B29C 73/163* (2013.01)

(58) Field of Classification Search
    CPC ......... B60C 17/00; B60C 17/10; B60C 23/12; B60C 23/10; B60B 15/28
    See application file for complete search history.

(56) References Cited

U.S. PATENT DOCUMENTS

| | | | | |
|---|---|---|---|---|
| 3,017,224 A | | 1/1962 | Palmer | |
| 4,169,497 A | * | 10/1979 | Tsuruta | ................... B60C 23/12 |
| | | | | 141/38 |
| 4,202,392 A | * | 5/1980 | Mineur | ................... B60C 17/10 |
| | | | | 152/521 |

(Continued)

*Primary Examiner* — Jason R Bellinger
(74) *Attorney, Agent, or Firm* — Mark M. Friedman

(57) ABSTRACT

A wheel rim accessory assemblable to a wheel of a vehicle, including: (a) a casing having an outlet adapted to be in fluid communication with the internal volume of the wheel, the casing being assemblable to the wheel rim of the wheel; (b) a filler substance disposed within the casing; and (c) a valve mechanism operationally coupled with the outlet, the valve mechanism controlling a flow of the filler substance from the casing to the internal volume of the wheel such that when a pressure level in the internal volume of the wheel is below a first predefined level, the valve mechanism allows the filler substance to flow into the internal volume until the pressure level reaches a second predefined level, wherein the second predefined level is equal to, or greater than, the first predefined level.

17 Claims, 10 Drawing Sheets

(56) References Cited

U.S. PATENT DOCUMENTS

| | | | |
|---|---|---|---|
| 4,289,187 A * | 9/1981 | Rivin | B60C 23/16 |
| | | | 138/30 |
| 4,470,506 A | 9/1984 | Goodell et al. | |
| 5,178,701 A * | 1/1993 | Taylor | B60C 17/00 |
| | | | 152/418 |
| 6,401,743 B1 | 6/2002 | Naedler | |
| 6,605,654 B1 | 8/2003 | Fang et al. | |
| 6,758,250 B2 * | 7/2004 | Cowart | B60C 17/00 |
| | | | 152/158 |
| 8,685,513 B1 | 4/2014 | Dry | |
| 2006/0201598 A1 * | 9/2006 | Rheinhardt | B60C 23/004 |
| | | | 152/418 |
| 2006/0220814 A1 | 10/2006 | Kawashima | |
| 2008/0060734 A1 | 3/2008 | Stehle | |
| 2009/0294005 A1 | 12/2009 | Firestone | |
| 2010/0024939 A1 | 2/2010 | Kusunoki et al. | |
| 2012/0018070 A1 | 1/2012 | Schulte et al. | |
| 2012/0234447 A1 * | 9/2012 | Narloch | B60C 23/004 |
| | | | 152/418 |

\* cited by examiner

WHEEL RIM ACCESSORY AND METHOD FOR ASSEMBLING THEREOF

TECHNICAL FIELD

The present invention relates to the field of run flat tires. More particularly, the invention relates to an accessory for a wheel and method for assembling thereof.

BACKGROUND

A run-flat tire is a pneumatic vehicle tire that is designed to resist the effects when punctured, and to enable the vehicle to continue to be driven.

However, a conventional tire cannot be turned to a run-flat tire.

Other aspects of the invention will become apparent as the description proceeds.

SUMMARY

In one aspect of the invention, the invention provides a method and apparatus for turning a convention tire to a run-flat tire.

In one aspect of the invention, the invention provides a solution to the above-mentioned and other problems of the prior art.

In one aspect, the present invention is directed to a wheel accessory (10) comprising: a casing (64), for containing a tire sealant (20) and a mechanism for releasing the tire sealant (20) for sealing a vehicle wheel (60), wherein the casing (64) is assemblable to the vehicle wheel (60) by bolts (18), which assemble a metal wheel (16) of the vehicle wheel (60) to a hub (46) of the vehicle.

In one aspect, the present invention is directed to a runflat tire, including: a first filler container, filled with a first filler, and disposed in a space of a vehicular tire, wherein the pressure in the first filler container is higher than the pressure of the tire; a first valve, used as a septum/valve between the space of the first filler container and the space of the tire, the first valve being adapted to open when the pressure in the tire gets under a first level, and to close when the pressure in the tire gets above a second level; wherein the second level is equal to or greater than the first level; and wherein the first filler expands upon exiting the first filler container.

According to one embodiment of the invention, the first filler is condensed air. According to one embodiment of the invention, the first filler comprises material (such as material which blocks hole(s) in the tire) which blocks hole(s) in the tire. Preferably, the first filler container is in an annular form, and disposed along the extent of a wheel of the tire. The run-flat tire may further comprise a second filler container, filled with a second filler, and having a second valve, wherein a reaction between the first filler with the second filler generates a substance having a volume greater than the volume of the first filler and the second filler.

The run-flat tire may further comprise a mixing cell having an outlet disposed in the inner side of the tire, wherein the first valve and the second valve are disposed in the mixing cell, thereby increasing the reaction. According to one embodiment of the invention, the first filler is magnesium and the second filler is water.

According to one embodiment of the invention, at least one of the levels is determined by a first spring that pushes a valve thereof in one direction, and a second spring that draws the valve to an opposite direction.

The run-flat tire may further comprise an isolation substrate between said wheel of said tire and the filler container(s). Preferably, the run-flat tire is adapted to be balanced.

According to the present invention there is provided wheel accessory assemblable to a wheel of a vehicle, the wheel comprising a metal wheel having a vehicle facing surface, a curb facing surface and a tire facing surface and a tire, the tire adapted to be mounted on the wheel rim thereby defining an internal volume of the wheel between the tire facing surface and the tire, the wheel accessory including: (a) a casing having an outlet adapted to be in fluid communication with the internal volume of the wheel, the casing being assemblable to the wheel of the wheel; (b) a filler substance disposed within the casing; and (c) a valve mechanism operationally coupled with the outlet, the valve mechanism controlling a flow of the filler substance from the casing to the internal volume of the wheel such that when a pressure level in the internal volume of the wheel is below a first predefined level, the valve mechanism allows the filler substance to flow into the internal volume until the pressure level reaches a second predefined level, wherein the second predefined level is equal to, or greater than, the first predefined level.

According to further features in preferred embodiments of the invention described below the filler substance is a gas or a sealant. The sealant may be a viscous carrier fluid.

According to still further features in the described preferred embodiments the sealant includes at least one of: a fibrous material, a polymeric material and a combination thereof.

According to further features the wheel accessory further includes a sealant material adapted to be mixed with the gas, the sealant material selected from the group comprising: a fibrous material, a polymeric material and a combination thereof.

According to further features the wheel accessory further includes a sealant adapted to be released prior to the gas.

According to further features the valve mechanism is operationally coupled to a pressure gauge.

According to further features the pressure gauge controls operation of the valve mechanism such that when a pressure value measured by the pressure gauge of the pressure level in the internal volume of the wheel is below the first predefined level the valve mechanism opens and when the pressure value increases to the second predefined level the valve mechanism closes.

According to further features the valve mechanism is controlled based on values measured by the pressure gauge.

According to further features the valve mechanism is electrically or mechanically operated.

According to further features the filler substance includes: (b)(i) a first filler disposed in a first filler container, and (b)(ii) a second filler disposed in a second filler container; and the valve mechanism includes: (c)(i) a first valve interposed between the first filler container and the outlet, and (c)(ii) a second valve interposed between the second filler container and the outlet the first valve and second valve adapted to transform to an open state allowing the first and second fillers to flow to the outlet when the pressure level in the internal volume of the wheel is under the first predefined level, and to transform to a closed state wherein the first valve and the second valve are closed, preventing the first filler from exiting the first container and the second filler from exiting the second container when the pressure level in the internal volume of the wheel is above the second predefined level.

According to further features the first filler reacts with the second filler to produce a gas.

According to further features the first filler further includes a sealant material selected from the group comprising: a fibrous material, a polymeric material and a combination thereof.

According to further features the wheel accessory further includes (d) a mixing cell interposed between the valve mechanism and the outlet, the mixing cell adapted to receive a portion of the first filler and a portion of the second filler so as to allow the portions to react with each other to produce a substance selected from the group comprising: a gas, a sealant and a combination thereof. According to further features the casing is adapted to be assembled to the curb facing surface of the wheel. According to further features the outlet includes an end-pipe adapted to couple with an air valve of the wheel. According to further features the wheel accessory further includes a balancing weight disposed on an outer edge of the casing.

According to further features the wheel accessory further includes a peripheral track encircling the outer edge, wherein the balancing weight is adapted to slide in the track.

According to further features the casing is adapted to be assembled to the vehicle facing surface of the wheel. According to further features the outlet includes a flexible pipe adapted to pass through an aperture in the wheel and couple with an air valve of the wheel.

According to further features the outlet includes an end-pipe connected to communicate with the internal volume of the wheel via an access channel formed in the vehicle facing surface of the wheel. According to further features the casing is adapted to be assembled to the tire facing surface of the wheel. According to further features the wheel accessory further includes a wireless transmitter configured to be in electrical communication with a remote computing device. According to further features the wireless transmitter is configured to communicate values measured by the pressure gauge to the remote computing device.

According to further features the wireless transmitter is configured to communicate instructions from the remote computing device to control the valve mechanism.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF DRAWINGS

Embodiments, features, and aspects of the invention are described herein in conjunction with the following drawings.

The drawings are not necessarily drawn to scale.

DETAILED DESCRIPTION

The present invention will be understood from the following detailed description of preferred embodiments of the invention, which are meant to be descriptive and not limiting. For the sake of brevity, some well-known features, methods, systems, procedures, components, circuits, and so on, are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

For the purposes of this document, the following terminology is used:

The term "wheel of a vehicle" refers to a vehicular wheel such as a wheel of a car which includes two components, a composite metal wheel and a rubber tire.

The term "tire" refers herein to the rubber component of the wheel. In some cases the term may refer to the entire wheel, when evident from the context.

The term "metal wheel" of simply "wheel" refers herein to the metal wheel body, without the rubber tire. The wheel includes a center piece (disk) of the wheel with holes for mounting the wheel on the hub, spokes which radiate from the center of the wheel to the curved rim, holes between the spokes and the curved section of the wheel.

The wheel has a vehicle facing surface, a curb facing surface and a tire facing surface. The "vehicle facing surface" refers herein to the entire surface of the wheel (center piece, spokes, holes and curved section) that, when mounted on the vehicle hub, faces the vehicle.

The "curb facing surface" refers herein to the entire surface of the wheel that faces away from the car, e.g. when the vehicle is positioned next to a curb, the surface that faces the curb is the curb facing surface.

The "tire facing surface" refers herein to the concave surface of the wheel over which the rubber tire is mounted. When the tire is mounted on the wheel, the tire facing surface and the tire define an internal volume of the wheel. The internal volume is inflated via an air valve until the air pressure inside the internal volume of the wheel reaches the recommended level.

Figure 1:
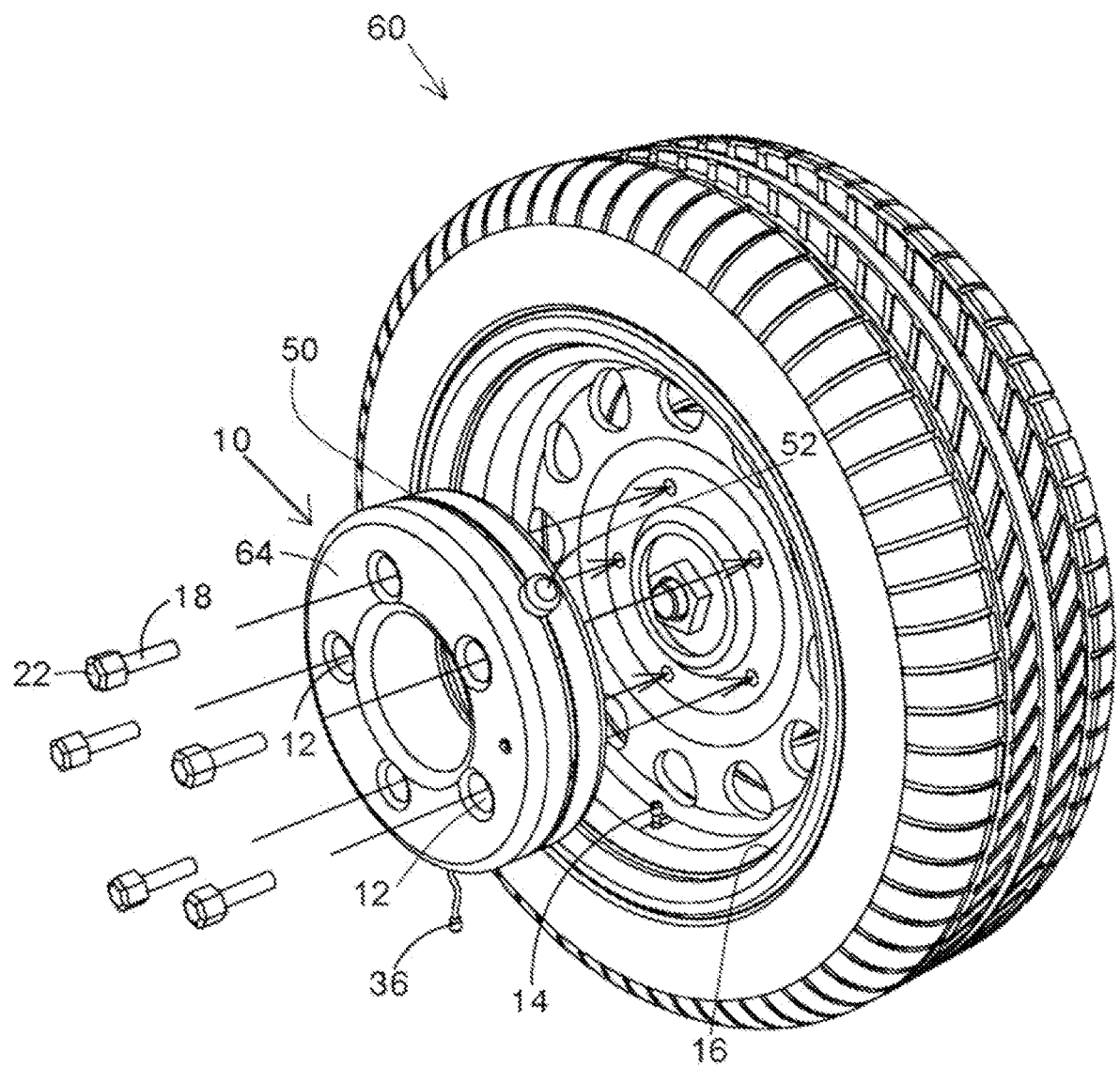
FIG. 1 is a wheel accessory, for turning, according to one embodiment of the invention, a conventional tire to a run flat tire.

FIG. 1 is an exploded view of a wheel accessory, for turning, according to one embodiment of the invention, a conventional tire to a run flat tire.

A wheel accessory 10, according to one embodiment of the invention, is designed to be assembled to the metal wheel 16 of the wheel 60 of the vehicle. According to the embodiment of FIG. 1, wheel accessory 10 is assemblable by the bolts 18, which assemble wheel 16 to the vehicle. According to the embodiment of FIG. 1, wheel accessory 10 is assemblable to the external side of the vehicle, otherwise referred to as the curb facing surface of the wheel, thus wheel accessory 10 is disposed between heads 22 of bolts 18 and wheel 16. According to this embodiment, wheel accessory 10 includes several holes 12, each for threading one of bolts 18 therethrough. Preferably, holes 12 are sufficiently wide for a standard tightening tool to be used. In some embodiments, bolts 18 are slightly longer than the standard wheel bolts, to compensate for the additional volume of the wheel accessory 10 or at least the back plate (not shown) of wheel accessory which is sandwiched between the heads 22 of the bolts 18 and the wheel 16.

Figure 2:
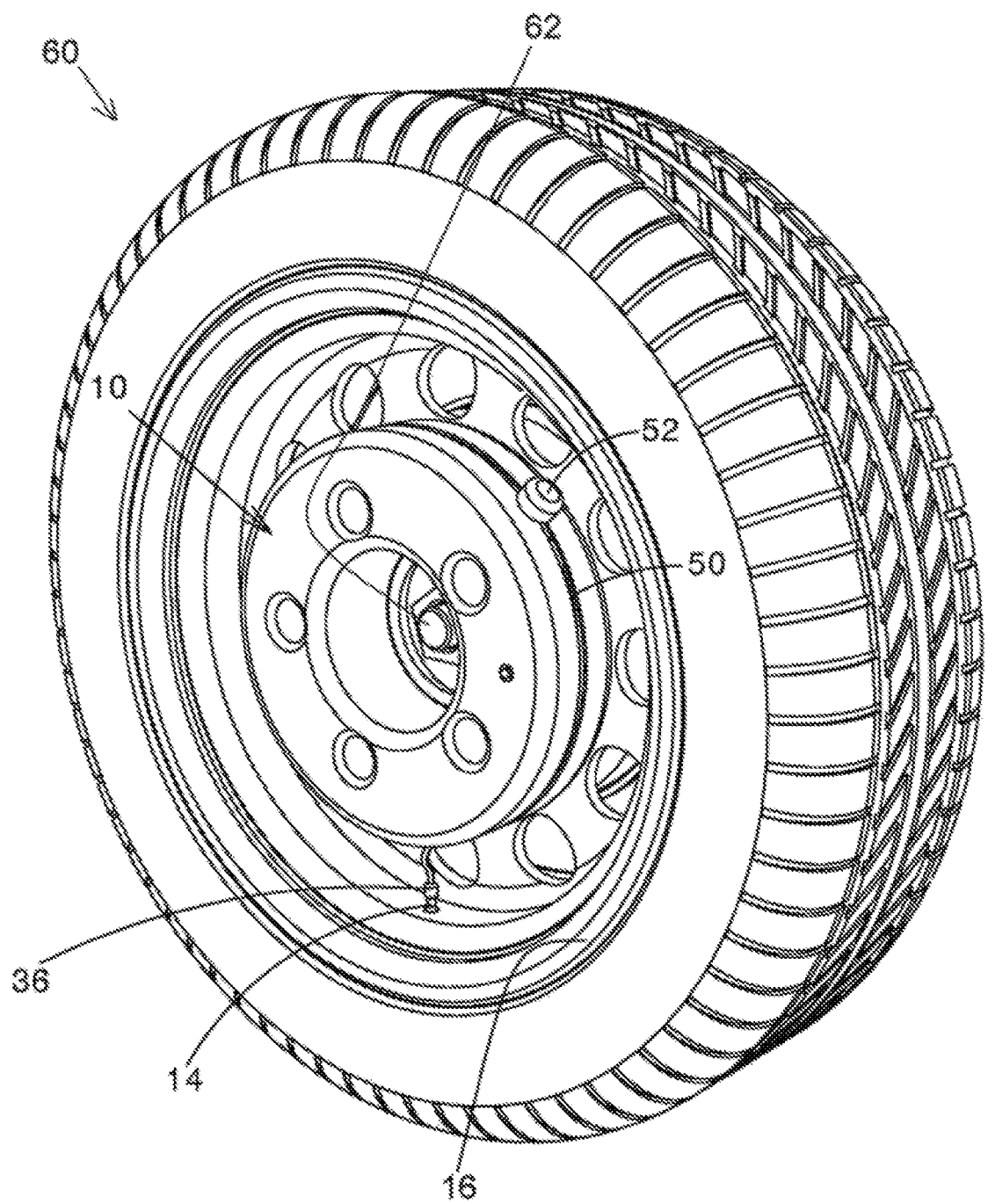
FIG. 2 depicts the wheel accessory of FIG. 1, after assembling it to the wheel.

FIG. 2 depicts the wheel accessory of FIG. 1, after assembling it to the disk of the wheel.

Wheel accessory 10 is shaped round, i.e., as a hollowed circle, for evenly surrounding the center 62 of wheel 60. The weight of wheel accessory 10 is further roundly evenly distributed, for evenly distributing the weight thereof around center 62 of wheel 60. Wheel accessory 10 may include an exception to the round even distribution, being a balancing weight 52, which may be added, for correcting non-even weight distribution. The even weight distribution is of the weight of wheel accessory 10 plus the weight of wheel 60. Wheel accessory 10 may include a peripheral track 50, for locating balancing weight 52 in a selected location, which balances the overall weight distribution. Balancing weight 52 slides in track 50 until located in the selected location. The weight is then fastened in place. Exemplarily, the balancing weight may include a bolt and nut arrangement for tightening and loosening the weight respective to track 50.

Wheel accessory 10 includes casing 64 which houses a filler substance. The casing has an outlet that provides fluid communication between the contents of the casing and the internal volume of the wheel. A valve mechanism controls the flow of filler substance from the casing to the wheel. When pressure in the wheel falls below a first predefined pressure level, the valve mechanism allows the filler substance to flow into the wheel until the pressure level rises to a second predefined level. The second predefined level is equal to, or greater than, said first predefined level.

After the physical assembling of wheel accessory 10 to wheel 16, an end pipe 36 of wheel accessory 10 is connected to the air valve 14 of wheel 60. End pipe 36 is part of the outlet arrangement.

In one exemplary embodiment, casing 64 of wheel accessory 10 contains filler substance such as compressed air or gas. In another exemplary embodiment, the filler substance disposed in casing 64 is tire sealant. Exemplarily, the tire sealant is a viscous carrier fluid and at least one fibrous material, polymeric material or combination of both. In some embodiments the composition remains fluid in the container and solidifies after being injected into the tire. Exemplarily, the sealant activates as foam. In another exemplary embodiment, casing 64 contains both compressed air and a sealant.

In some embodiments, where the content of the casing includes material other than gas, it may be necessary to remove the valve core (not shown) from the mouth of the air valve 14, in order to introduce fluid that is thicker than compressed air and/or to prevent clogging of the valve.

In some embodiments, casing 64 further includes a mechanism for detecting loss of air of wheel 60. In some embodiments, the mechanism for detecting loss of air of wheel 60 is a pressure gauge which is configured to detect the level of air pressure in wheel 60. In some embodiments, casing 64 includes a mechanism for executing the release of the contents of the casing. In some embodiments, the mechanism for detecting loss of air (e.g. by detecting loss of air pressure in the tire), is the same mechanism for releasing the contents of the casing. For example, a unidirectional valve may be held closed under pressure from the air inside the tire. Once the air pressure in the tire drops below a certain, predefined, first level, the spring-loaded, unidirectional valve opens and compressed air (or other gas/fluid) is injected into the tire until the air pressure inside the tire rises back up to a second predefined level. The second predefined air pressure level is equal to, or greater than, the first level.

In some embodiments, a pressure gauge, or other mechanism for detecting loss of air in the tire, is integrated into pipe end 36. In some embodiments, the mechanism for detecting loss of air in the tire is located inside casing 64. In some embodiments, the release mechanism is a two stage release mechanism where a sealant is first released or injected into the tire and then, if the air pressure in the tire is still below the aforementioned first predefined level, compressed air is injected into the tire. According to the embodiment discussed with reference to FIG. 6, release of the compressed air, gas and/or sealant can be controlled remotely, via a wireless connection, by a mobile computing device or an onboard computing device in the vehicle.

Figure 3:
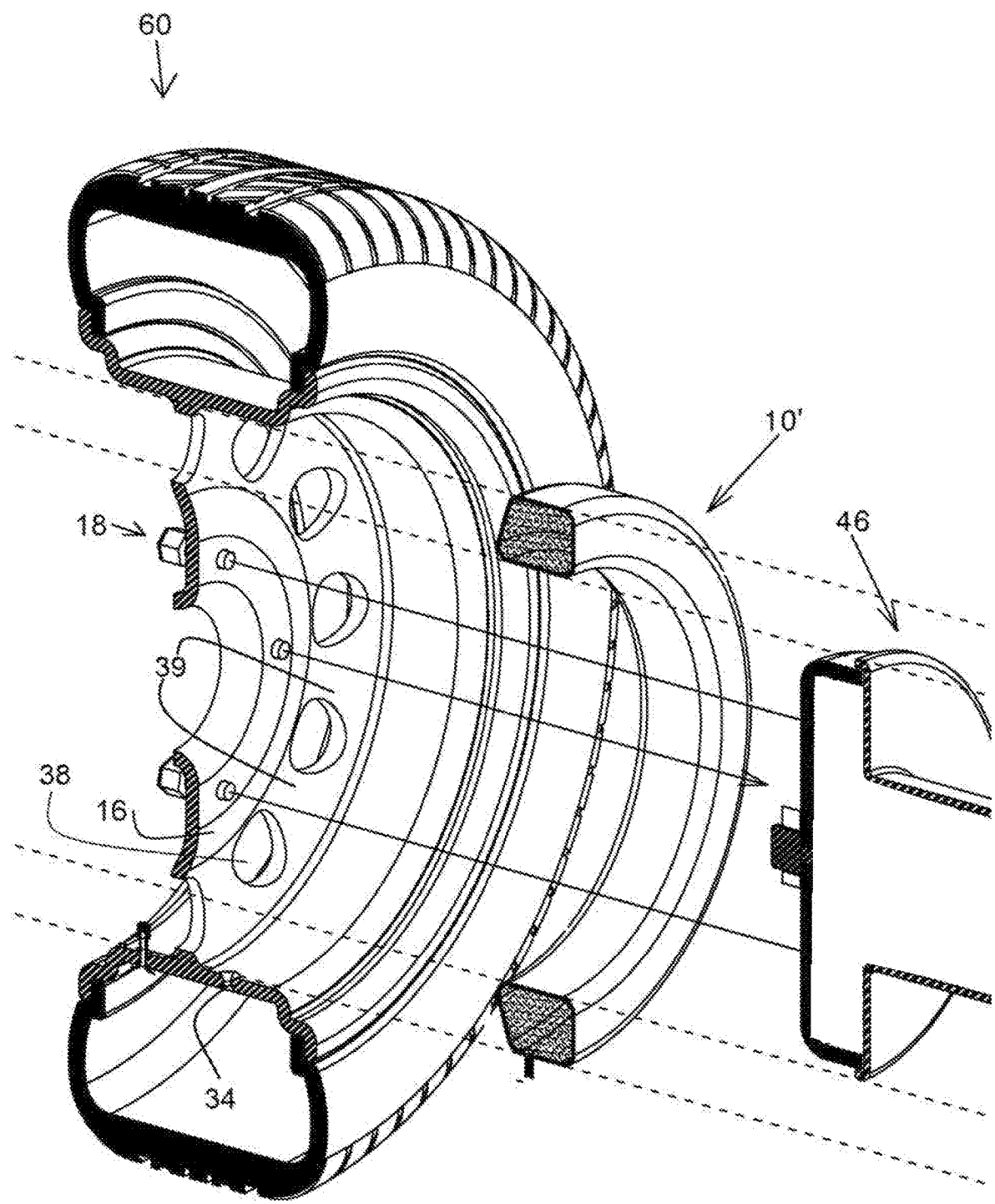
FIG. 3 is a wheel accessory, for turning, according to another embodiment of the invention, a conventional tire to a run flat tire.

FIG. 3 is an exploded, cross-sectional perspective view of another embodiment of an innovative wheel accessory 10' and vehicle hub 46. The wheel accessory is used for turning a conventional tire to a run flat tire. Conventionally, wheel 60 is assembled to the hub 46 of the vehicle by bolts 18, and even the non-professional user is capable of applying this assembling. According to the embodiment of FIG. 3, a casing or wheel accessory 10' may also be assembled even by a non-professional using the bolts 18, which assemble wheel 16 to the vehicle. In contrast to the embodiment of FIG. 1, according to the embodiment of FIG. 3, wheel accessory 10' is assembled to the internal side of the wheel, i.e., wheel accessory 10' is disposed between wheel 16 and the hub 46 of the vehicle.

Figure 4:
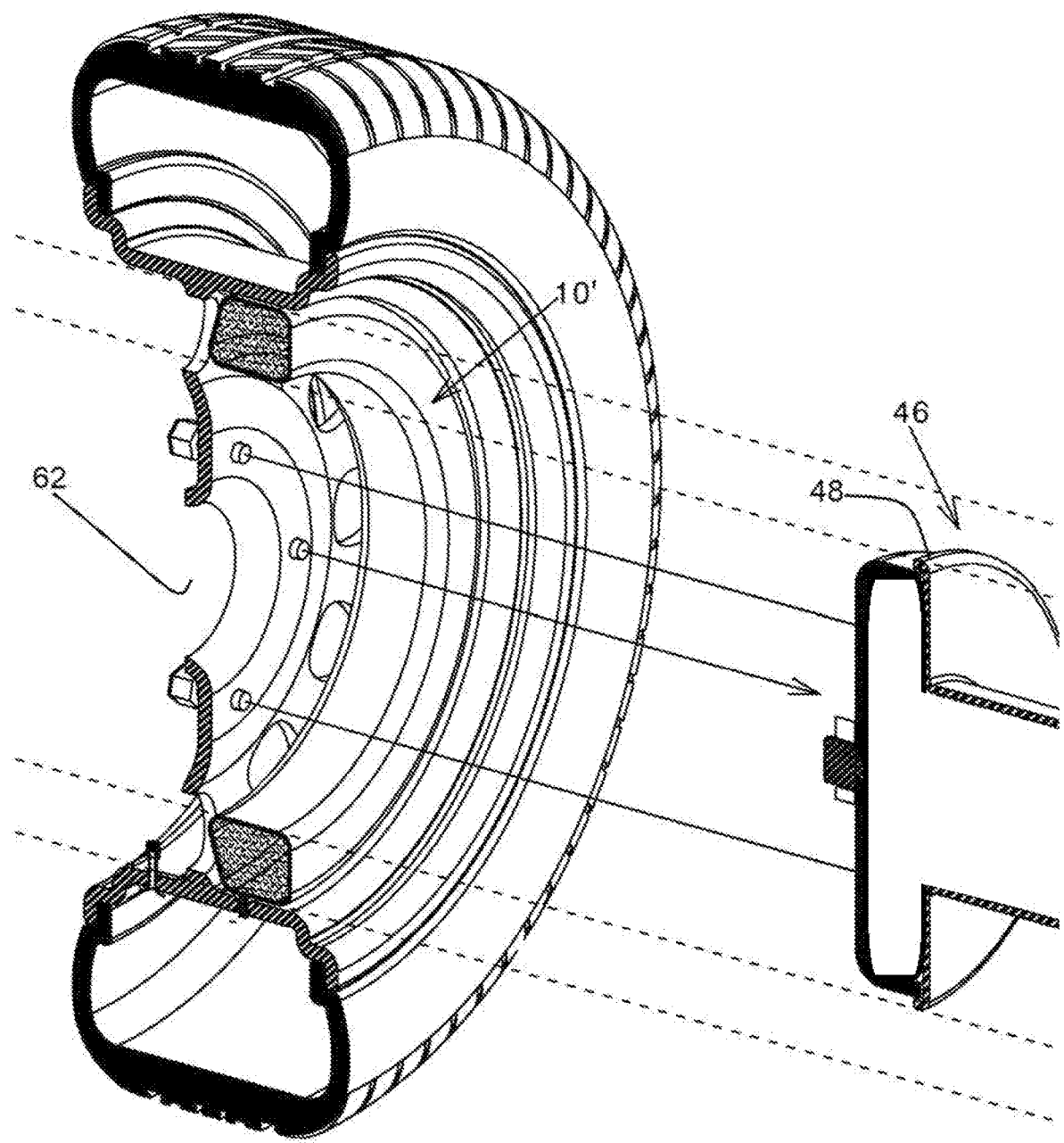
FIG. 4 depicts the wheel accessory of FIG. 3, after assembling it to the wheel.

FIG. 4 is a cross-sectional perspective view of the wheel accessory and vehicle hub of FIG. 3, after assembling wheel accessory 10' to the disk of the wheel. Wheel accessory 10' has an annular shape, for evenly surrounding the center 62 of wheel 60. The weight of wheel accessory 10' is further roundly evenly distributed, for evenly distributing the weight thereof around center 62 of wheel 60. Wheel accessory 10' is shaped in a manner to fit in a space between an outer edge of hub 46 and an internal side rim of wheel 60. When assembled in place, wheel accessory 10' is positioned flush against spokes 39 and spaces 38 of the wheel, and fitted between hub 46 and the internal rim of wheel 60.

Figure 5:
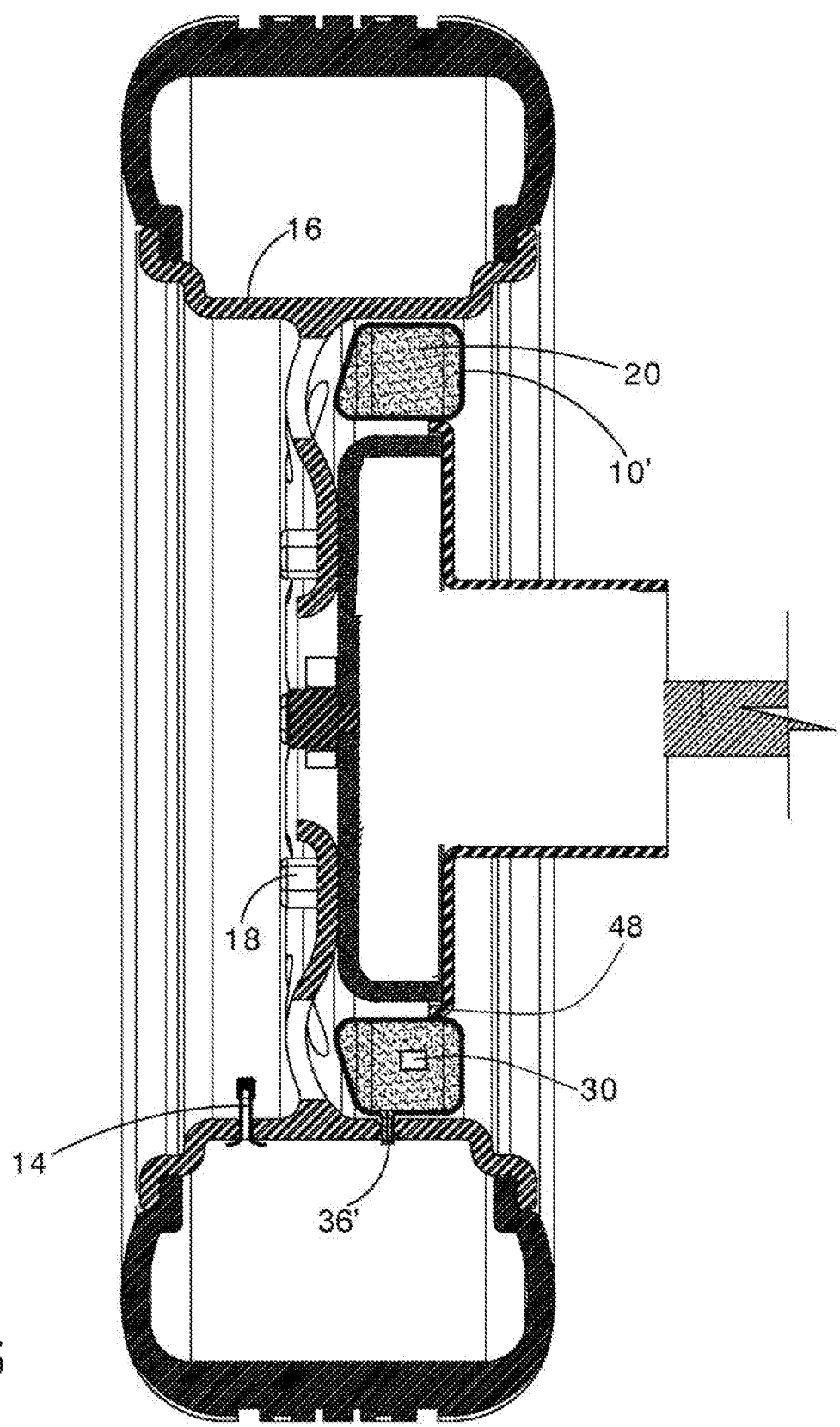
FIG. 5 depicts the wheel accessory of FIG. 3, after assembling it and the wheel to the hub of the vehicle.

FIG. 5 depicts a cross-sectional view of the wheel accessory of FIG. 3, after assembling the wheel accessory and the wheel to the hub of the vehicle.

After the physical assembling of wheel accessory 10' to wheel 16, end pipe 36' of wheel accessory 10' may be connected to communicate with the air of wheel 60. As depicted in FIG. 53, an access channel 34 would need to be prepared in the wheel. Exemplarily, the channel can be similar to the channel through which air valve pipe 14 extends. In another embodiment, end-pipe 36' can be an elongated, flexible pipe that is passed through an aperture 38 of the wheel 16 and connected to air valve 14 (in a manner similar to that which was described in further detail above for embodiment 10 of the wheel discussed above with reference to FIGS. 1 and 2).

In one exemplary embodiment, wheel accessory 10' contains a filler substance tire sealant 20, such as foam. In another embodiment, wheel accessory 10' contains compressed air 20. In yet another embodiment, wheel accessory 10' contains compressed air and tire sealant 20. In some embodiments, the compressed air and tire sealant are housed within wheel accessory 10' in separate containers.

According to any of the embodiments above, wheel accessory 10' further contains a pressure gauge for detecting loss of air of wheel 60. In some embodiments, wheel accessory 10' further contains a mechanism 30 for executing the release of the tire sealant. In some embodiments, wheel accessory 10' contains a combination pressure gauge and mechanism for executing the release of tire sealant 30.

In some embodiments, a pressure gauge, or other mechanism for detecting loss of air in the tire, is integrated into pipe end 36'. In some embodiments, the mechanism for detecting loss of air in the tire is located inside wheel accessory 10' (e.g. mechanism 30). In some embodiments, the release mechanism is a two stage release mechanism where a sealant is first released or injected into the tire and then, if the air pressure in the tire is still below the aforementioned first predefined level, compressed air is injected into the tire. According to the embodiment discussed with reference to FIG. 6, release of the compressed air and/or the sealant can be controlled remotely, via a wireless connection, by a mobile computing device or an onboard computing device in the vehicle.

In some embodiments, as depicted in FIGS. 3-5, hub 46 includes a lip 48, that further secures wheel accessory 10' in place. In some embodiments lip 48 abuts wheel accessory 10' and pressures it against the internal rim of the wheel, firmly holding the accessory in place. In other embodiments (not shown), a lip or back plate sandwiches wheel accessory 10' between the lip or back plate (of the vehicle) and wheel.

Figure 6:
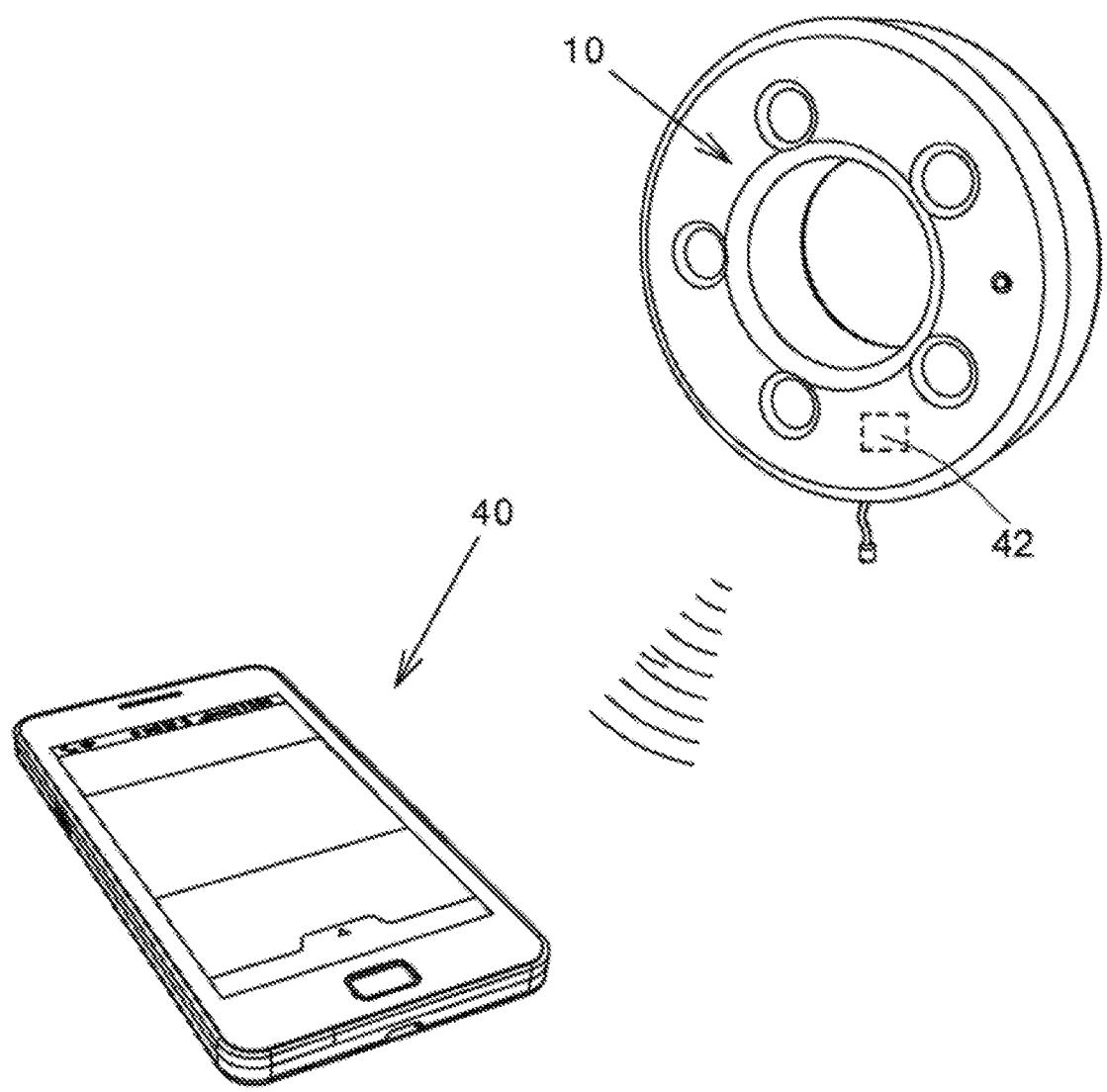
FIG. 6 depicts a transmitter of the wheel accessory of FIG. 1.

FIG. 6 depicts a transmitter of the wheel accessory of FIG. 1. Wheel accessory 10 may include a transmitter and related circuitry and components (e.g. microcontrollers, processors, servos etc.) 42 (referred to hereafter as transmitter 42). In some embodiments, transmitter 42 is a wireless transmitter that is operationally coupled to the mechanism for detecting loss of air and/or the mechanism releasing the contents of the casing. In preferred embodiments, transmitter 42 is adapted to communicate values from pressure gauge readings. For example, when air pressure within tire 60 is below a predefined level, transmitter 42 is triggered to send a notification to the end user device (e.g. handheld smartphone or onboard computer). Exemplarily, the notification may be a general notification informing the end user that the air pressure is low, or a specific notification that includes the value of the pressure reading.

In preferred embodiments, transmitter 42 is operationally coupled to the mechanism for releasing the contents of casing 64. In preferred embodiments, transmitter 42 is adapted to receive instructions from a remote device and communicate instructions to the mechanism for releasing the contents of casing 64. For example, when an end user receives a notification that air pressure is low in the tire, the end user, using a dedicated application on the mobile device, can instruct the release mechanism to inject compressed air and/or sealant into the tire. Once the air pressure reaches the desired level, or sufficient sealant fluid has been injected, the mechanism may automatically turn off. The release mechanism may have a servo-controlled valve and/or a mechanical valve.

Exemplarily, transmitter 42 is paired with, or otherwise in remote communication with a mobile computing device such as cell phone 40 and/or an onboard vehicular computer (not shown). The transmitter may use any form of wireless communication such as, but not limited to, WiFi, cellular transmissions, BlueTooth™ etc.

In some embodiments, transmitter 42, or a similar mechanism, may be likewise installed in wheel accessory 10' or run-flat tire 110/110' discussed below.

Figure 7:
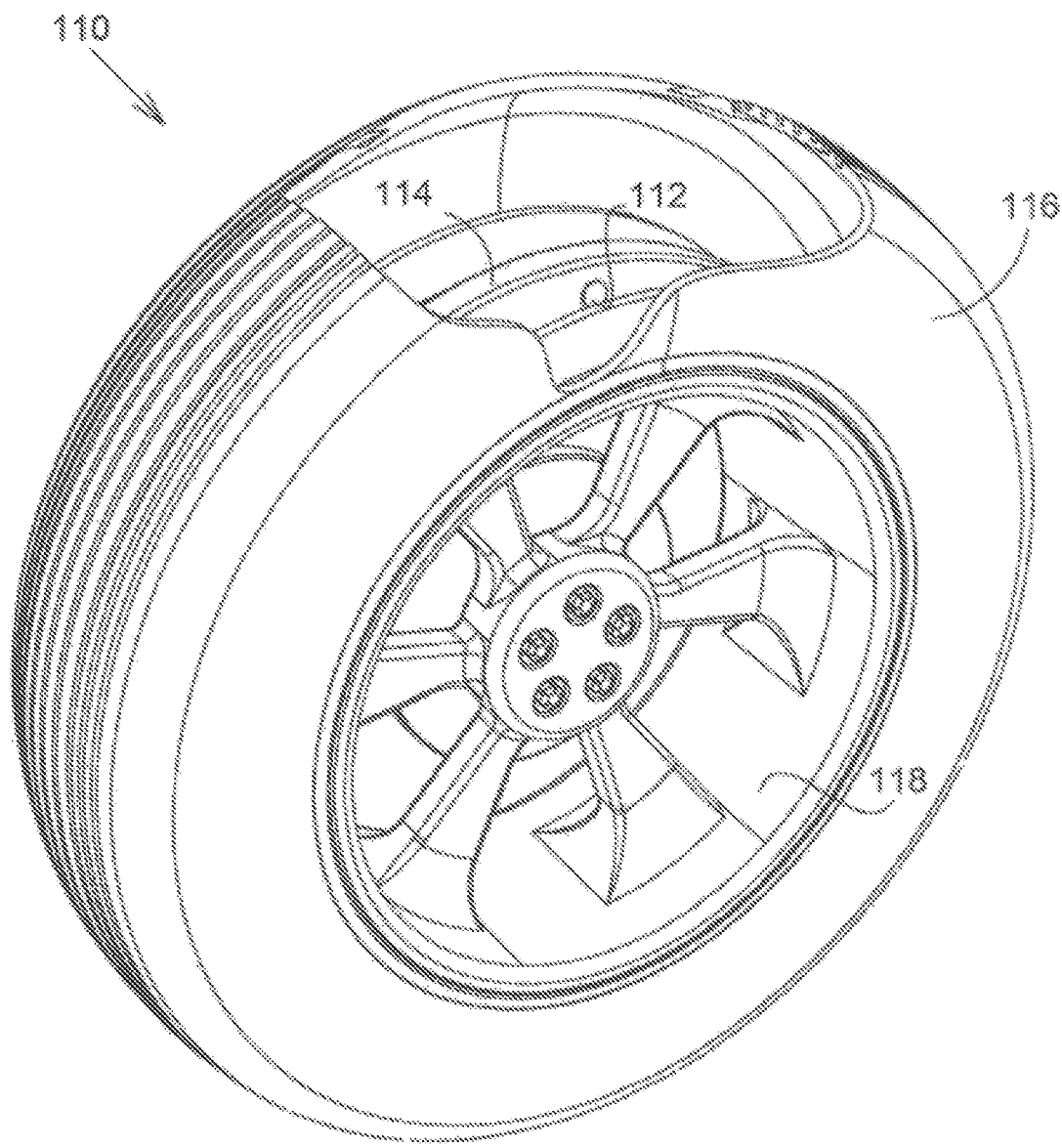
FIG. 7 is a sectioned view schematically illustrating a run-flat tire, according to one embodiment of the invention.

Another embodiment of the immediate invention is illustrated in FIG. 7. FIG. 7 is a sectioned view schematically illustrating a run-flat tire, according to an embodiment of the invention. The run-flat tire in this figure is marked by reference numeral 110. The run flat-tire 110 comprises a "regular" tire 116 installed on a "regular" vehicular wheel 118. Along the extent of the vehicular wheel 118, in the inner side of tire 116, is disposed a casing or filler container 114.

In filler container 114 is installed a valve mechanism 112 which opens a passageway between filler container 114 and tire 116 when the gas pressure in tire 116 is lower than a certain level, e.g. 30 PSI. When the gas pressure in tire 116 reaches to this certain level, or higher than this certain level, the valve closes the passageway, leaving the gas pressure in the tire at the desired level.

The main object of the substance in filler container 114 is to inflate tire 116 when the gas pressure in the tire goes under a certain level, until reaching to the certain level. Additionally or alternatively, the substance may block holes in the tire, which may be the cause of its deflation.

Presently, there are aerosol cans comprising a substance which inflates a tire. When a user is aware of a flat tire, he may inflate the tire by this aerosol. The substance used in such devices can also be used in the present invention.

Another example of such filler is a gas condensed in a pressure higher than the air pressure of the tire. Thus, when the tire gets flat, the valve opens and allows the compressed air from the container to enter into the tire, and inflate the tire. Of course, the filler can also contain material that blocks or seals possible holes in the tire.

Figure 8:
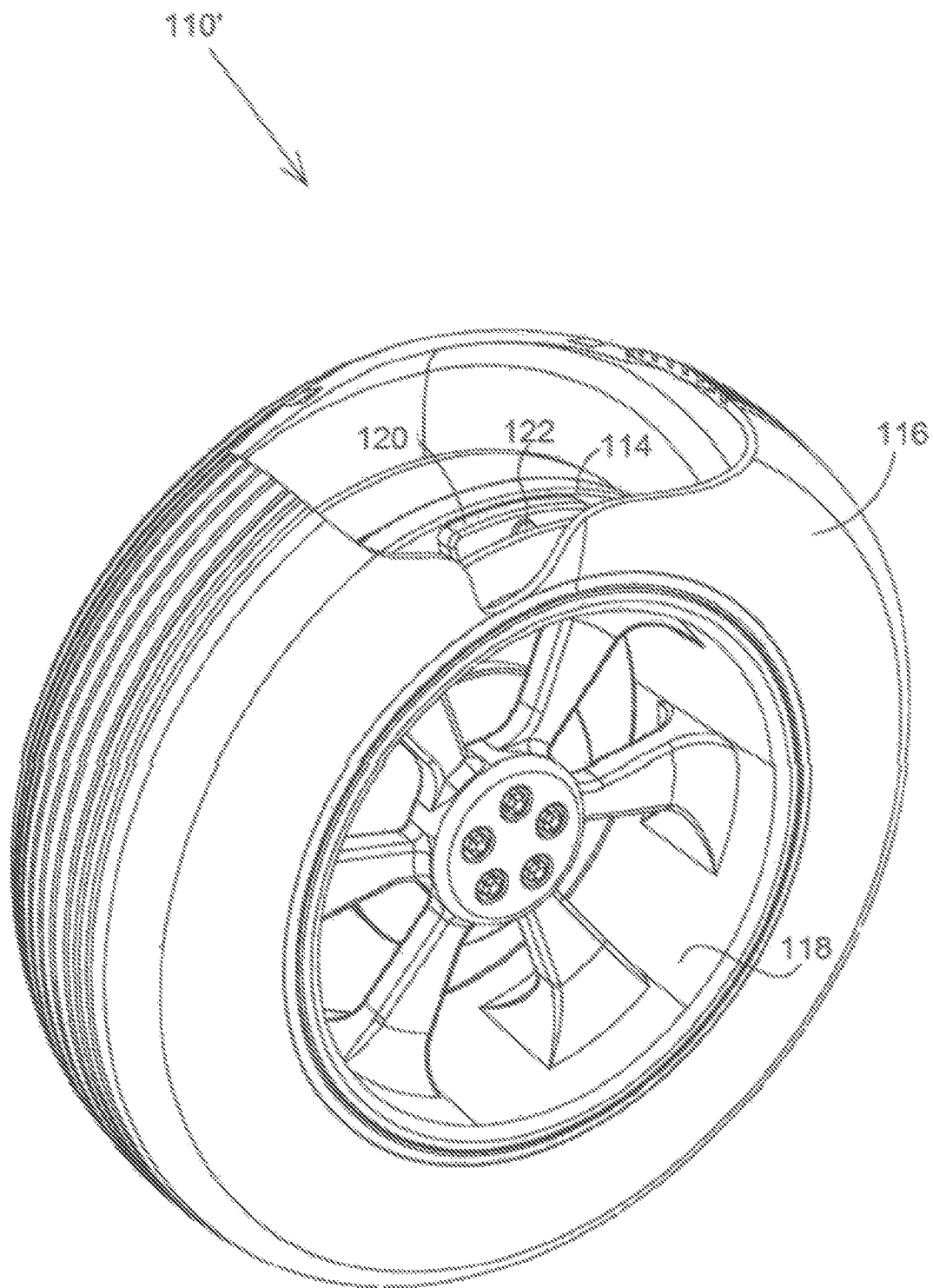
FIG. 8 is a broken view that schematically illustrates a run-flat tire (10'), according to another embodiment of the invention.

FIG. 8 is a sectional view that schematically illustrates a run-flat tire (110'), according to another embodiment of the invention.

Figure 9:
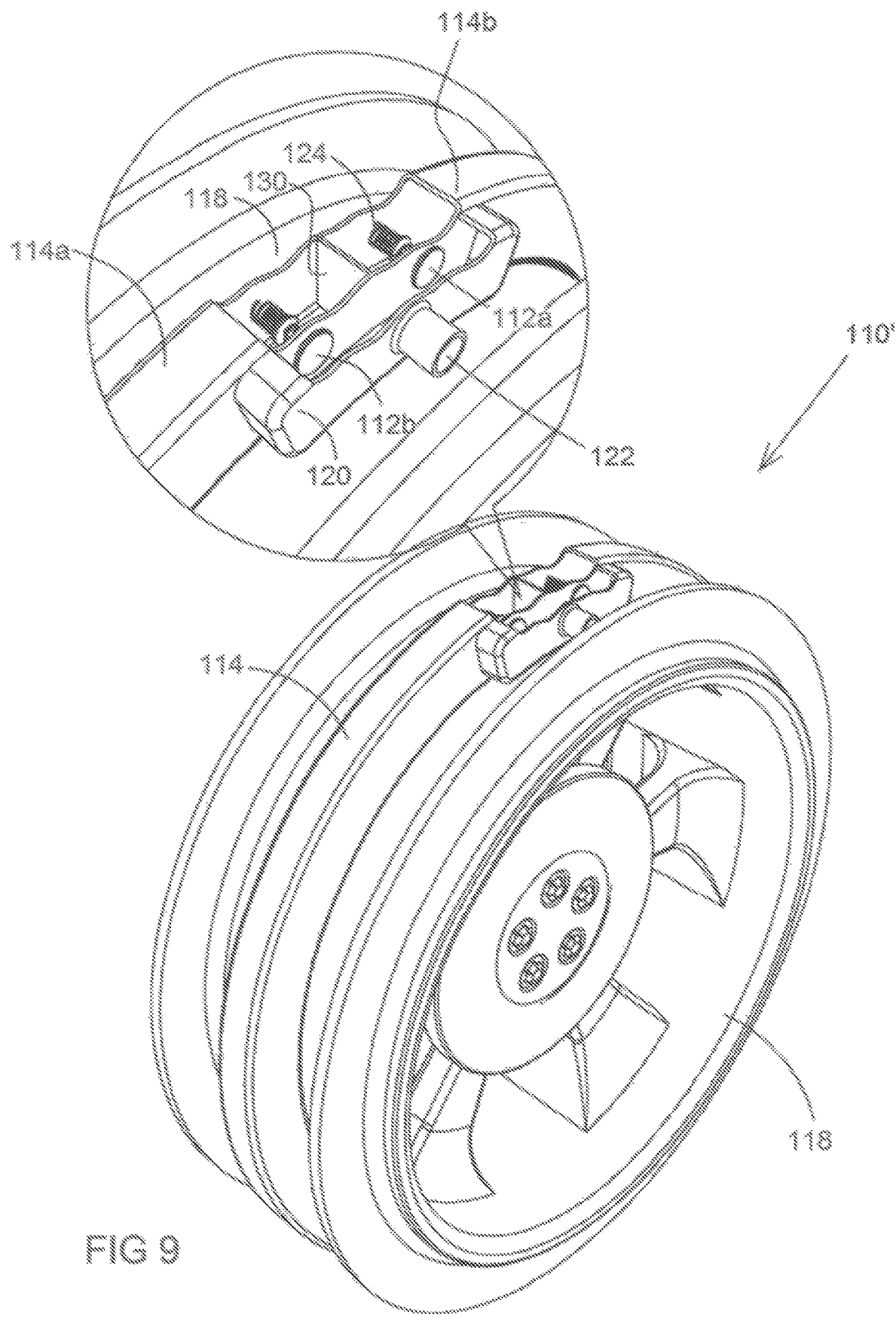
FIG. 9 is a broken view which further details the mechanism of the run-flat tire of FIG. 8.
Figure 10:
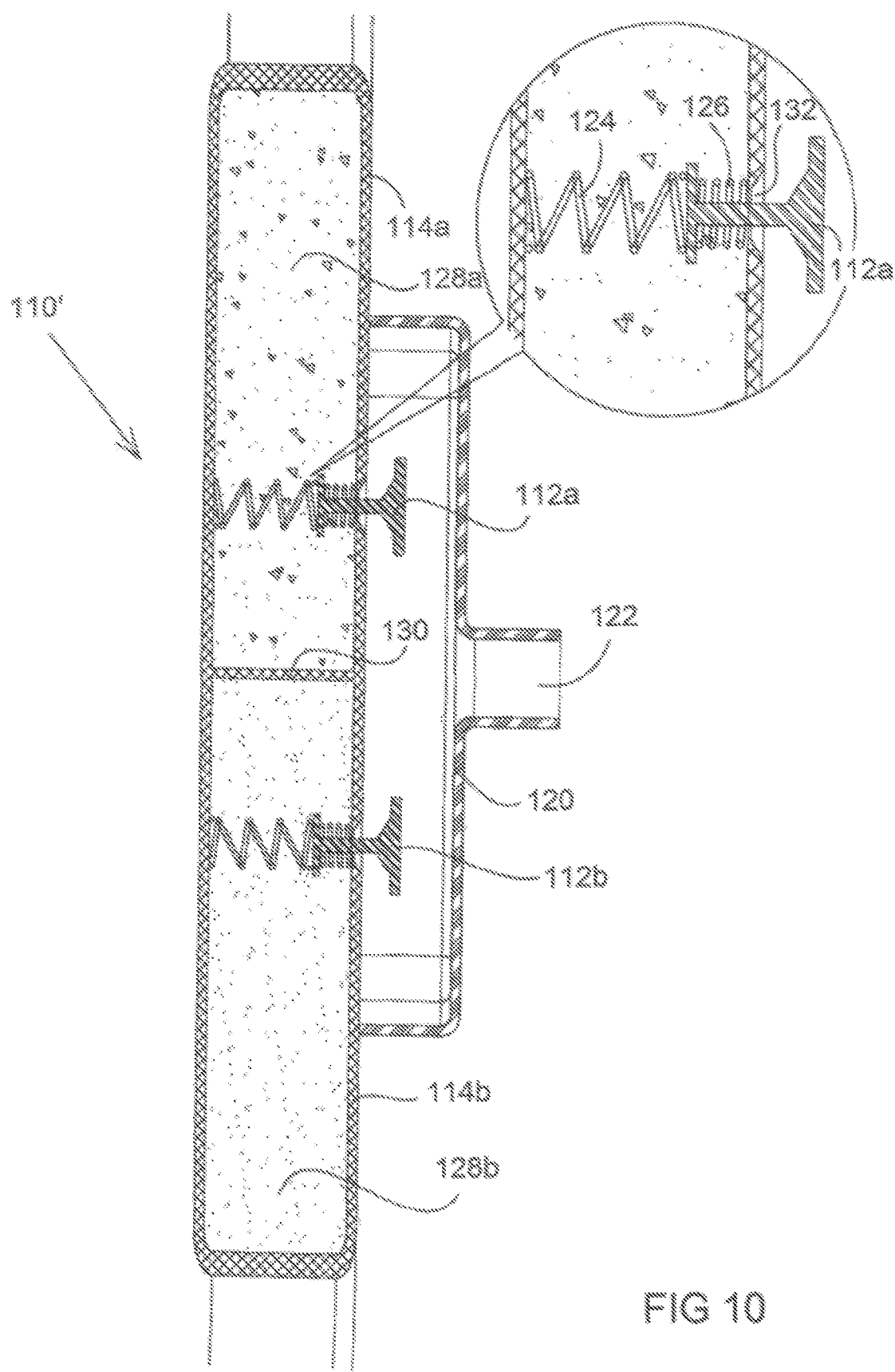
FIG. 10 is a cross-section along the run-flat tire of FIG. 8, which focuses on the structure of the valves.

FIG. 9 is an isometric view of the wheel (without tire) of run-flat tire 110' and a magnified view of the innovative mechanism of the run-flat tire of FIG. 8. In this figure, the tire is not presented, thereby revealing the pressure loss compensation mechanism disposed in the tire. The figure includes sectional views of filler containers 114a and 114b, and also the mixing cell 120. FIG. 10 is a cross-sectional view of filler containers 114a and 114b, and also the mixing cell 120 along the run-flat tire of FIG. 8, which focuses on the structure of the valves.

According to this embodiment of the invention, the run flat tire 110' casing comprises two filler containers 114a and 114b, each comprising a different filler material and a valve mechanism operationally coupled with an outlet 122. The fillers are of a type that when they meet, they generate an inflating substance, such as foam or gas. Reference numeral 130 denotes a septum between filler container 114a and 114b. The mixing cell 120 is positioned in the vicinity of the septum, such that it abuts at least a part of filler container 114a and a part of filler container 114b. In each of these parts is disposed a first valve 112a and a second valve 112b respectively.

The mixing cell 120 is in fluid communication with outlet 122, through which the generated substance exits into the tire. The mixing cell is not mandatory, but it improves the mixing operation, as the substances meet in a "small" space. When not using the mixing cell, the substances meet in the space of the tire, which is much larger, and therefore the inflating effect is carried out more slowly in comparison to using of a mixing cell.

Each of the valves 112a and 112b is used as a septum between the respective container and the mixing cell 120. Each of the valves is designed to open a passageway between the filler container thereof (114a, 114b) and the mixing cell 120 when the air pressure within the tire is lower than a first level, and to close when the air pressure within the tire increases to a second level.

The second level must be equal to or greater than the first level. Preferably, the second level is greater than the first predefined level. FIGS. 9 and 10 illustrate a valve that can fulfill these requirements. The zoomed view is of valve 112a. The situation of the valve is determined by: (a) opening spring 124, (b) closing spring 126, (c) the air pressure in filler container 114a, and (d) the air pressure in the tire.

While spring 124 pushes valve 112a outwards, spring 126 resists this action. Thus, when the tire is not flat, the air pressure inside the tire and the power of spring 126 push valve 112a towards filler container 114a, thereby keeping opening 132 sealed. However, when the tire gets flat, the air pressure in filler container 114a and the power of spring 124 overcome the resistance of spring 126 and the air pressure inside the tire, and as a result the valve moves outwards and opens opening 132, thereby enabling substance 128a of filler container 114a to penetrate into mixing cell 120. The characteristics of the valve can be determined by using springs of different constancy.

It should be noted that although preferably the form of the filler containers is annular, this form is not mandatory. The annular form allows distributing the mass container along the extent of wheel 118, thereby keeping the balance of the wheel while rotating.

According to Le Chatelier's principle, if a chemical system at equilibrium experiences a change in concentration, temperature, volume, or partial pressure, then the equilibrium shifts to counteract the imposed change and a new equilibrium is established.

For example, Magnesium mixed with water generates an explosion reaction $Mg\ (s) + 2\ H_2O\ (l) \rightarrow Mg(OH)_2\ (s) + H_2\ (g)$, which releases energy, and therefore immediately increases the pressure of a closed space. A use of foamed Polyurethanes in such a reaction may block holes in a flat tire.

In another embodiment, filler container 114 is segmented into a plurality of paired sub-containers 114a and 114b (and optionally, mixing cells 120). For example, filler container 114 can be segmented into two pairs of sub-containers on opposite sides of the wheel; or into three pairs spaced equidistantly from each other; or four or more pairs. In preferred embodiments, filler container 114 is removably coupled to the wheel. For example, filler container 114 may include a buckle arrangement and hinge (opposite the buckle) for clasping the filler container to the wheel.

While the embodiments of the invention depicted in FIGS. 1-2 and 3-5 can be installed by a non-professional, the inner-tire embodiments described with reference to FIGS. 7-10 can only be installed by a car repair professional or manufactured together with the wheel or one skilled in the art of tire removal from the wheel.

In order to implement the inner-tire embodiments of the invention, it is necessary to ensure that valves 112a and 112b remain closed from the time that the mechanism (filler chamber 114) is mounted on the wheel, while the tire is mounted on the wheel until the tire is filled with air and the desired air pressure is achieved. Once the air pressure is at or above the first predefined level discussed above, the valve mechanisms 112a and 112b must be rendered inoperable.

In one embodiment, mixing cell 120 is pressurized to at least the first predefined level and outlet 122 is sealed. Once optimum air pressure has been achieved in the tire, outlet 122 is remotely opened and the mechanism for detecting air pressure loss is 'activated'. In one exemplary embodiment, outlet 122 is hermetically sealed by a cap having an open position and a closed position. One example of such a cap is a push/pull bottle cap (also known as a "sports" bottle cap). In one embodiment, outlet 122 is reversibly sealed by a battery operated servo mechanism that is remotely controlled by a transmitter 42 (similar to the transmitter and related circuitry and components shown in FIG. 6 in relation to casing 10). In another embodiment, outlet 22 is sealed by a mechanical plug or cap (e.g. a push/pull cap discussed above). The plug has two positions, open and closed. The plug has a pulling thread attached thereto which is threaded through the core-less air valve tube when the tire is mounted on the wheel.

The standard procedure to placing a tire on a wheel and filling the tire with air is performed by a car repairman or factory worker. The professional first mounts the tire beads on to the rims of the wheel. This is usually accomplished with the help of a rotating tire machine and some standard implements. The core-less valve is then thread through the valve hole in the wheel. A high volume air hose is attached to the core-less valve and the tire is filled with air. Once the desired air pressure has been achieved, the tire professional removes the hose and installs the valve core which effectively seals the valve.

In the aforementioned exemplary embodiments of the immediate invention, a number of additional steps are required. Before the tire is mounted on the wheel, the pulling thread is threaded through the core-less air valve. The thread does not prevent mounting of the air hose or obstruct the air flow in any way, while the tire is being filled. One the tire is mounted and air is filled into the tire with the air hose, the tire professional removes the hose, tugs on the thread which opens outlet 122, cuts the thread at the mouth of the valve and installs the valve core. As the thread is cut, the remaining line within the valve drops out of the valve into the internal volume of the tire.

In another embodiment, outlet 122 is sealed with a sealing material that melts when heated. When the wheel is used in a standard manner, the wheel and consequently the air inside the wheel gets hot. Preferably the sealing material has a known melting point, where the melting point is within the temperature range that the wheel reaches when used in a conventional manner. As such, the first time the wheel in used in a manner that raises the temperature of the wheel, the sealing material melts and the mechanism is activated.

In another embodiment, outlet 122 is sealed with a pressure sensitive sealing mechanism. For example, the sealing mechanism transforms from a closed state to an open state when subjected to a predefined air-pressure level. The sealing mechanism is a one-way mechanism transforming from closed to open under pressure but does not revert back to the open state when the air pressure drops.

In another embodiment, the aforementioned pressure sensitive sealing mechanism is, alternatively, a two-way mechanism where a high pressure level opens the outlet and a low pressure level closes the outlet. In preferred embodiments, the high air pressure level is above the first predefined level discussed above and less or equal to the second redefined level. Preferably the low air pressure level is much lower than the first predefined level. As such, the outlet will be opened and the mechanism will be activated when the tire is properly pressurized (e.g. 31 psi). On the other hand, the outlet will close again when there is very little air left in the tire. For example, when a tire is removed from the rim (e.g. in order to fix a puncture) the air is first let out of the tire and then the tire is remove from the rim. In such a scenario, as the air pressure approaches zero, the outlet will close and the stored materials will not be expelled unnecessarily.

In all the embodiments of the invention, the accessory that converts the regular tire into a run-flat tire, whether it be wheel accessory 10, wheel accessory 10' or filler container 114, the innovative accessory can be fitted to the wheel post manufacture. The term 'retrofit' is used herein to denote a post-manufacture improvement of the wheel. The filler material (whether gas, fluid, fibrous material or some combination thereof) is only introduced into the tire volume when pressure falls below the predefined first level. The filler material may be introduced automatically due to a mechanical arrangement or a computer-based automation. Alternatively or additionally, the filler material may be introduced into the volume of the tire manually, by sending a remote signal from a handheld computing device or a vehicular computing device.

In the figures and/or description herein, the following reference numerals have been mentioned:
  numeral 110 and 110' denote run-flat tires, according to two embodiment of the invention;
  each of numerals 112, 112a and 112b denotes a valve;
  each of numerals 114, 114a and 114b denotes a filler container;
  numeral 116 denotes a tire;
  numeral 118 denotes a vehicular wheel;
  numeral 120 denotes a mixing cell;
  numeral 122 denotes an outlet of the mixing cell;
  numeral 124 denotes a first spring;
  numeral 126 denotes a second spring;
  each of numerals 128a and 128b denotes a filler;
  numeral 130 denotes a septum between filler container 114a and filler container 114b; and
  numeral 132 denotes an opening controlled by valve 112a.
  numerals 10 and 10' denote the wheel accessories/casings, according to two embodiments;
  numeral 12 denotes a hole in the casing of the accessory, for threading a bolt therethrough;
  numeral 14 denotes the air valve of the wheel;
  numeral 16 denotes the metal wheel of the wheel of the vehicle;
  numeral 18 denotes a bolt, for assembling the wheel of the hub of the vehicle;
  numeral 20 denotes a gas or fluid stored in the wheel accessory;
  numeral 22 denotes the head of the bolt;
  numeral 30 denotes a pressure gauge/release mechanism/combination pressure gauge and release mechanism;
  numerals 36 and 36' denote an end pipe;
  numeral 40 denotes a cell phone;
  numeral 42 denotes a transmitter;
  numeral 46 denotes a hub of the vehicle;
  numeral 50 denotes a peripheral track;
  numeral 52 denotes a balancing weight;
  numeral 60 denotes the wheel of the vehicle;
  numeral 62 denotes the center of the wheel;
  numeral 64 denotes the casing of the wheel accessory;

The foregoing description and illustrations of the embodiments of the invention has been presented for the purposes of illustration. It is not intended to be exhaustive or to limit the invention to the above description in any form. It is made clear that features described for one embodiment of the invention can be applied to other embodiments of the invention in similar ways. Variations and combinations of the features disclosed with regards to one or more embodiments can be applied to the same or other embodiments.

Any term that has been defined above and used in the claims, should to be interpreted according to this definition. The reference numbers in the claims are not a part of the claims, but rather used for facilitating the reading thereof. These reference numbers should not be interpreted as limiting the claims in any form.

What is claimed is:

1. A wheel accessory assemblable to a wheel of a vehicle, the wheel comprising a wheel disc having a vehicle facing surface, a curb facing surface and a tire facing surface and a tire, the tire adapted to be mounted on the wheel thereby defining an internal volume of the wheel between the tire facing surface and the tire, the wheel accessory comprising:
   (a) a casing having an outlet adapted to be in fluid communication with the internal volume of the wheel, said casing being assemblable to the tire facing surfaces of the wheel disc of the wheel;
   (b) a filler substance disposed within said casing; and
   (c) a valve mechanism operationally coupled with said outlet, said valve mechanism controlling a flow of said filler substance from said casing to the internal volume of the wheel such that when a pressure level in the internal volume of the wheel is below a first predefined level, said valve mechanism opens to allow said filler substance to flow into the internal volume and when said pressure level increases to a second predefined level, said valve mechanism closes wherein said second predefined level is equal to, or greater than, said first predefined level.

2. The wheel accessory of claim 1, wherein the filler substance is a gas.

3. The wheel accessory of claim 1, wherein the filler substance is a sealant.

4. The wheel accessory of claim 3, wherein said sealant is a viscous carrier fluid.

5. The wheel accessory of claim 4, wherein said sealant includes at least one of: a fibrous material, a polymeric material and a combination thereof.

6. The wheel accessory of claim 2, further comprising a sealant material adapted to be mixed with said gas, said sealant material selected from the group comprising: a fibrous material, a polymeric material and a combination thereof.

7. The wheel accessory of claim 2, further comprising a sealant, said sealant adapted to be released prior to said gas.

8. The wheel accessory of claim 1, wherein said valve mechanism is operationally coupled to a combination pressure gauge and release mechanism.

9. The wheel accessory of claim 8, wherein said combination pressure gauge and release mechanism controls operation of said valve mechanism such that when a pressure value measured by said pressure gauge of said pressure level in the internal volume of the wheel is below said first predefined level said valve mechanism opens and when said pressure value increases to said second predefined level said valve mechanism closes.

10. The wheel accessory of claim 8, wherein said valve mechanism is controlled based on values measured by said pressure gauge.

11. The wheel accessory of claim 10, wherein said valve mechanism is selected from the group of: an electrically operated valve and a mechanically operated valve.

12. The wheel accessory of claim 1, wherein said filler substance comprises:
   (b)(i) a first filler disposed in a first filler container, and
   (b)(ii) a second filler disposed in a second filler container;
   and said valve mechanism comprises:
   (c)(i) a first valve interposed between said first filler container and said outlet, and
   (c)(ii) a second valve interposed between said second filler container and said outlet
   said first valve and second valve adapted to transform to an open state allowing said first and second fillers to flow to said outlet when said pressure level in the internal volume of the wheel is less than said first predefined level, and to transform to a closed state wherein said first valve and said second valve are closed, preventing said first filler from exiting said first container and said second filler from exiting said second container when said pressure level in the internal volume of the wheel is above said second predefined level.

13. The wheel accessory of claim 12, further comprising:
   (d) a mixing cell interposed between said valve mechanism and said outlet, said mixing cell adapted to receive a portion of said first filler and a portion of said second filler so as to allow said portions to react with each other to produce a substance selected from the group comprising: a gas, a sealant and a combination thereof.

14. A wheel accessory assemblable to a wheel of a vehicle, the wheel comprising a wheel having a vehicle facing surface, a curb facing surface and a tire facing surface and a tire, the tire adapted to be mounted on the wheel thereby defining an internal volume of the wheel between the tire facing surface and the tire, the wheel accessory comprising:
   (a) a casing having an outlet adapted to be in fluid communication with the internal volume of the wheel, said casing being assemblable to the curb facing surface of the wheel of the wheel;
   (b) a filler substance disposed within said casing; and
   (c) a valve mechanism operationally coupled with said outlet, said valve mechanism controlling a flow of said filler substance from said casing to the internal volume of the wheel such that when a pressure level in the internal volume of the wheel is below a first predefined level, said valve mechanism opens to allow said filler substance to flow into the internal volume and when said pressure level increases a second predefined level, said valve mechanism closes wherein said second predefined level is equal to, or greater than, said first predefined level;
   a balancing weight disposed on an outer edge of said casing;
   a peripheral track encircling the outer edge, wherein said balancing weight is adapted to slide in the track.

15. The wheel accessory of claim 8, further comprising a wireless transmitter configured to be in electrical communication with a remote computing device.

16. The wheel accessory of claim 15, wherein said wireless transmitter is configured to communicate values measured by said pressure gauge to said remote computing device.

17. The wheel accessory of claim 15, wherein said wireless transmitter is configured to communicate instructions from said remote computing device to control said valve mechanism.

* * * * *